US012568060B2

(12) United States Patent
Tiwari et al.

(10) Patent No.: US 12,568,060 B2
(45) Date of Patent: Mar. 3, 2026

(54) SYSTEMS AND METHODS FOR CONTINUOUSLY RECEIVING, PROCESSING, AND CLASSIFYING HIGH-VOLUMES OF ELECTRONIC MAIL (EMAIL) USING EMAIL METADATA

(71) Applicant: JPMORGAN CHASE BANK, N.A., New York, NY (US)

(72) Inventors: Saurabh Tiwari, Bangalore (IN); Tuhin Bhura, Kolkata (IN); Shashanka Narayan, Chicago, IL (US); Vivek Prakash, Coppell, TX (US); Rahul Mittal, Naperville, IL (US); Prabhleen Kaur, Prosper, TX (US); Santosh Chikoti, Monroe Township, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 48 days.

(21) Appl. No.: 18/541,659

(22) Filed: Dec. 15, 2023

(65) Prior Publication Data

US 2025/0150426 A1 May 8, 2025

(30) Foreign Application Priority Data

Nov. 2, 2023 (IN) .............................. 202311074674

(51) Int. Cl.
*H04L 51/42* (2022.01)
*G06Q 10/107* (2023.01)
*H04L 51/08* (2022.01)

(52) U.S. Cl.
CPC .............. *H04L 51/42* (2022.05); *H04L 51/08* (2013.01); *G06Q 10/107* (2013.01)

(58) Field of Classification Search
CPC ......... H04L 51/42; H04L 51/08; H04L 51/00; H04L 51/07; H04L 51/21; G06Q 10/107
See application file for complete search history.

(56) References Cited

U.S. PATENT DOCUMENTS

| | | | | |
|---|---|---|---|---|
| 2013/0086180 A1* | 4/2013 | Midgen | .................. | G06F 16/353 709/206 |
| 2015/0341300 A1* | 11/2015 | Swain | ................... | G06F 16/287 707/738 |
| 2018/0203867 A1* | 7/2018 | McHenry | ................ | G06F 16/93 |
| 2021/0234813 A1* | 7/2021 | Narayan | ................ | G06N 3/045 |

(Continued)

*Primary Examiner* — Johnny B Aguiar

(74) *Attorney, Agent, or Firm* — GREENBERG TRAURIG LLP

(57) ABSTRACT

In some aspects, the techniques described herein relate to a method including: receiving, by a capture module, a reception notification from an email server, wherein the reception notification is triggered by an event handler of the email server and the event handler is configured to generate the reception notification upon receipt of an email in a mailbox of the email server; generating, by the capture module, a reception event including metadata related to the email that is received at the mailbox of the email server; sending, by the capture module, the reception event to an event streaming platform; retrieving, by a workflow engine, email metadata, wherein the email metadata is related to the email that is received at the mailbox of the email server; and providing, by the workflow engine and as input to a rules-based procedure, the email metadata.

17 Claims, 3 Drawing Sheets

Receiving, by a capture module, a reception notification from an email server, wherein the reception notification is triggered by an event handler of the email server and the event handler is configured to generate the reception notification upon receipt of an email in a mailbox of the email server — 210

Generating, by the capture module, a reception event including metadata related to the email that is received at the mailbox of an email server — 220

Sending, by the capture module, the reception event to an event streaming processor — 230

Retrieving, by a workflow engine, email metadata from the event streaming platform — 240

Providing, by the workflow engine and as input to a rules-based procedure, the email metadata — 250

Receiving, by the workflow engine and as output from the rules-based procedure, data related to a sender of the email — 260

Providing, by the workflow engine and as input to a machine learning model, the email metadata — 270

Receiving, by the workflow engine and as output from the machine learning model, a classification of the email — 280

Storing, by the workflow engine, the data related to the sender of the email and the classification of the email in a datastore, wherein the datastore is accessible to a client application for retrieval of the data related to the sender of the email and the classification of the email — 290

(56)                    References Cited

U.S. PATENT DOCUMENTS

2023/0077990 A1*   3/2023  Luo ........................ G06N 20/00
                                                       706/12
2024/0257060 A1*   8/2024  McNeil ................ H04L 51/212

* cited by examiner

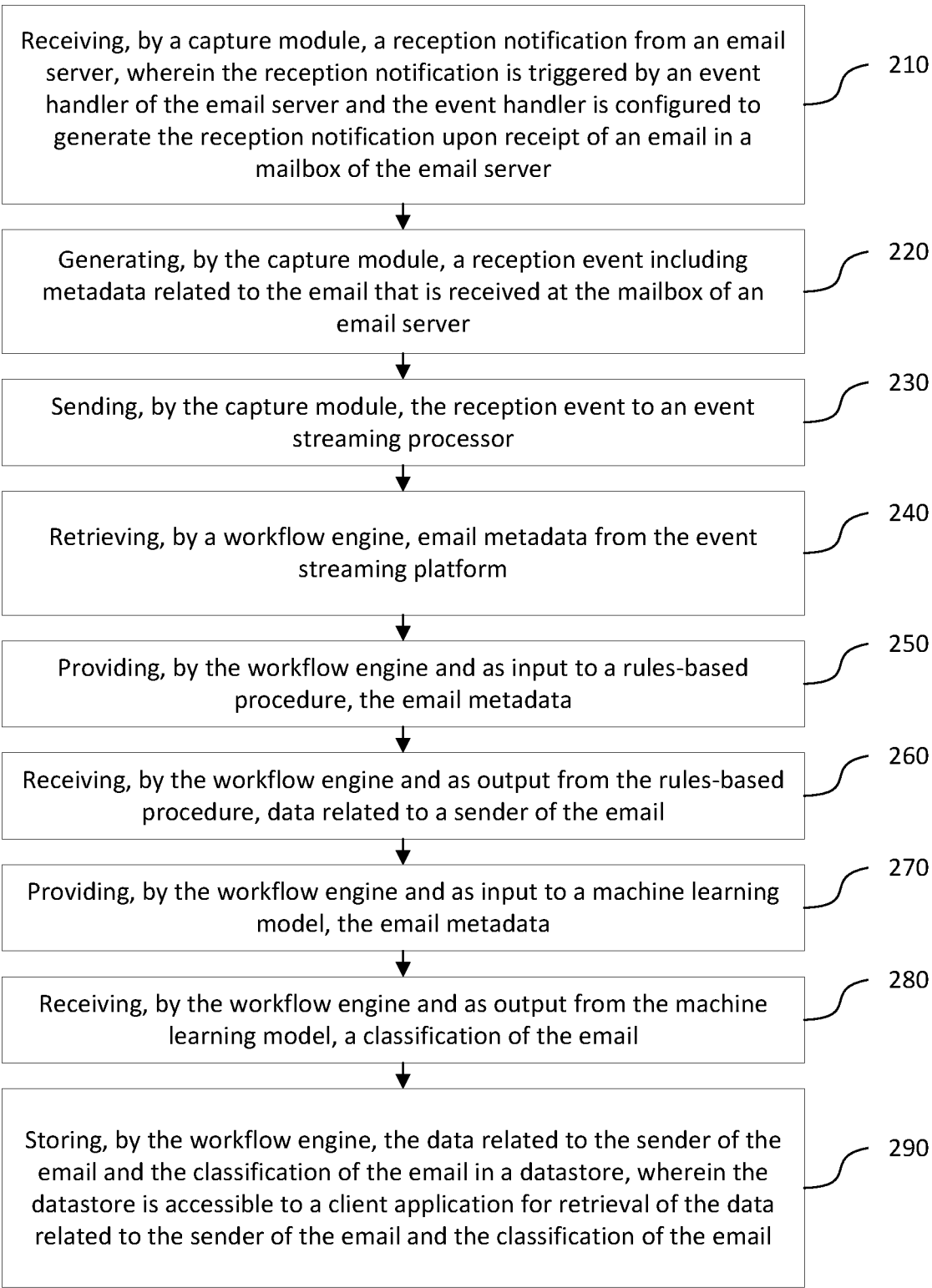

Receiving, by a capture module, a reception notification from an email server, wherein the reception notification is triggered by an event handler of the email server and the event handler is configured to generate the reception notification upon receipt of an email in a mailbox of the email server — 210

Generating, by the capture module, a reception event including metadata related to the email that is received at the mailbox of an email server — 220

Sending, by the capture module, the reception event to an event streaming processor — 230

Retrieving, by a workflow engine, email metadata from the event streaming platform — 240

Providing, by the workflow engine and as input to a rules-based procedure, the email metadata — 250

Receiving, by the workflow engine and as output from the rules-based procedure, data related to a sender of the email — 260

Providing, by the workflow engine and as input to a machine learning model, the email metadata — 270

Receiving, by the workflow engine and as output from the machine learning model, a classification of the email — 280

Storing, by the workflow engine, the data related to the sender of the email and the classification of the email in a datastore, wherein the datastore is accessible to a client application for retrieval of the data related to the sender of the email and the classification of the email — 290

FIGURE 2

SYSTEMS AND METHODS FOR CONTINUOUSLY RECEIVING, PROCESSING, AND CLASSIFYING HIGH-VOLUMES OF ELECTRONIC MAIL (EMAIL) USING EMAIL METADATA

BACKGROUND

1. Field of the Invention

Aspects generally relate to systems and methods for processing and classification of electronic mail.

2. Description of the Related Art

Organizations use shared electronic mail (i.e., email) mailboxes (referred to as "mailboxes" herein) for receiving and holding various business requests. Often, an organization will provide many different shared mailboxes, each for requesting a different service, process, etc. Because there is one point of collection for many senders, shared mailboxes can accumulate large numbers of incoming email messages that must be properly processed. Conventionally, human resources have been assigned to monitor and process email messages received at shared mailboxes. But high volumes of email messages can result in several employees being assigned to monitor and manage a single share mailbox. For an organization that provides several hundred shared mailboxes, this can result in considerable expenses with respect to human resources.

SUMMARY

In some aspects, the techniques described herein relate to a method including: receiving, by a capture module, a reception notification from an email server, wherein the reception notification is triggered by an event handler of the email server and the event handler is configured to generate the reception notification upon receipt of an email in a mailbox of the email server; generating, by the capture module, a reception event including metadata related to an email that is received at a mailbox of an email server; sending, by the capture module, the reception event to an event streaming processor; retrieving, by a workflow engine, email metadata, wherein the email metadata is related to an email that is received at a mailbox of an email server; providing, by the workflow engine and as input to a rules-based procedure, the email metadata; receiving, by the workflow engine and as output from the rules-based procedure, data related to a sender of the email; providing, by the workflow engine and as input to a machine learning model, the email metadata; receiving, by the workflow engine and as output from the machine learning model, a classification of the email; storing, by the workflow engine, the data related to the sender of the email and the classification of the email in a datastore, wherein the datastore is accessible to a client application for retrieval of the data related to the sender of the email and the classification of the email.

In some aspects, the techniques described herein relate to a method, wherein the metadata includes an attachment identifier, and the attachment identifier is related to an attachment that is attached to the email.

In some aspects, the techniques described herein relate to a method, including: retrieving, by the workflow engine, the attachment from a database, wherein retrieving the attachment includes using the attachment identifier as a lookup key in a query of the database.

In some aspects, the techniques described herein relate to a method, wherein the email metadata includes text from a subject line of the email and text from a body of the email.

In some aspects, the techniques described herein relate to a method, including: embedding the text from the subject line of the email, the text from the body of the email, and text from the attachment in a vector embedding.

In some aspects, the techniques described herein relate to a method, wherein the input to the machine learning model includes the vector embedding.

In some aspects, the techniques described herein relate to a method, wherein the metadata is retrieved from an event streaming platform.

BRIEF DESCRIPTION OF THE DRAWINGS

FIG. 2 is a logical flow for processing and classification of electronic mail, in accordance with aspects.

DETAILED DESCRIPTION

Figure 1:
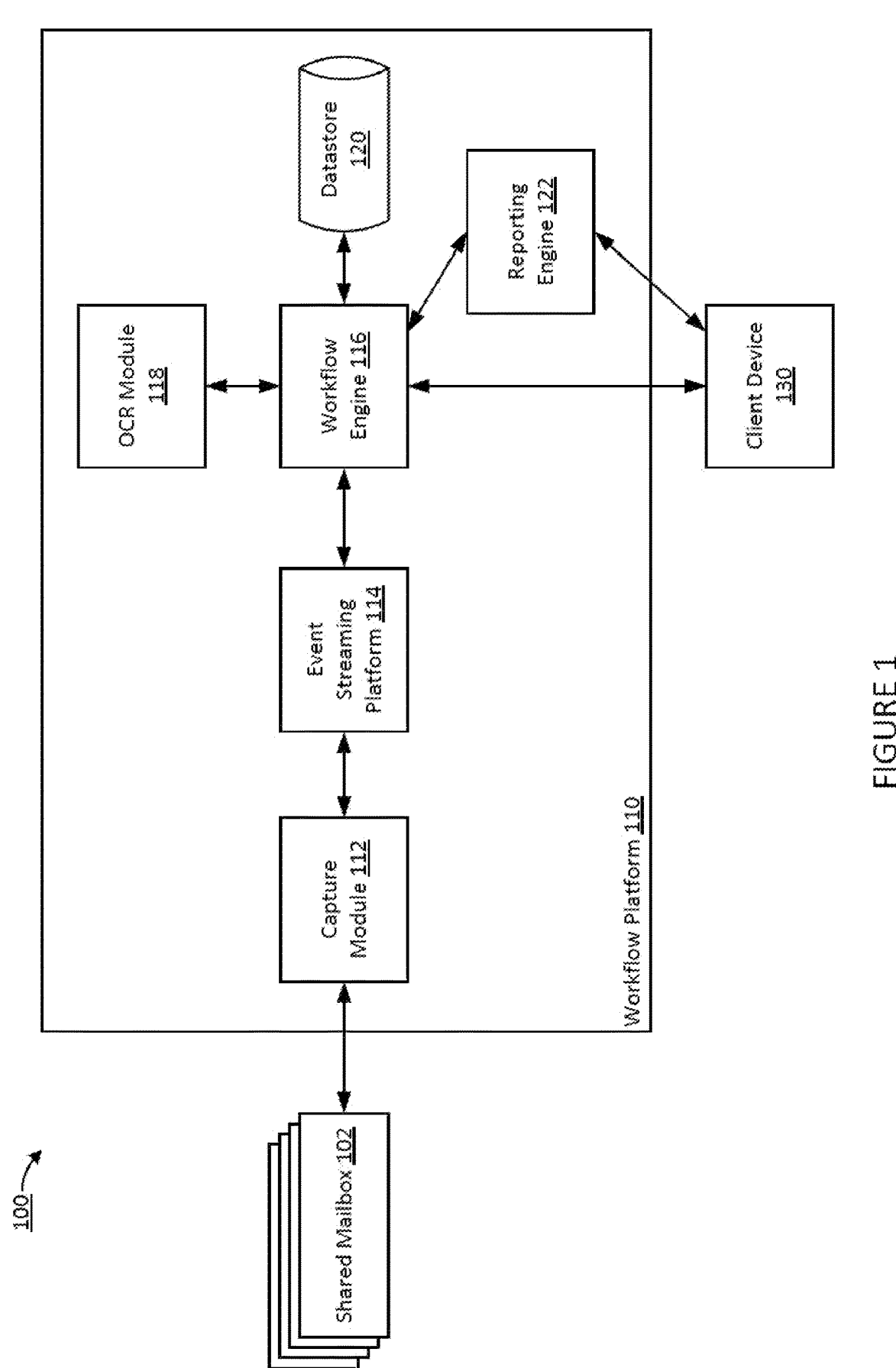
FIG. 1 is a block diagram of a system for processing and classification of electronic mail, in accordance with aspects.

Aspects generally relate to systems and methods for processing and classification of electronic mail.

Aspects disclosed herein are directed to processing of mail received at one or more of an organization's shared electronic mail mailboxes. Aspects may be configured to receive a reception notification from an email server at a capture module. The capture module may generate, based on receiving the reception notification, an event that is sent to an event streaming platform in response to receiving a reception notification from a mail server. An email processing engine may subscribe to a topic published by the event streaming platform and may consume email reception events from the topic. For each reception event consumed from the event streaming platform, an email processing engine may perform processing including data enrichment using machine learning (ML) models, rules-based processing, etc., and create and/or assign an email to a workflow case that is relevant to the received email.

In accordance with aspects, organizations may use shared email mailboxes to receive emails from entities such as customers, partners, etc., that include requests for initiation of a workflow, or information that is related to a previously initiated workflow. A workflow may include work to be performed by the receiving organization (where the receiving organization is an implementing organization with respect to the techniques described herein). Such work may be related to the goods and/or services that the receiving organization provides to its customers, partners, etc. As noted above, manual processing of emails received in a shared mailbox is time consuming and labor intensive, and aspects described herein may automate the workflow assignment process.

In accordance with aspects, an implementing organization may provide one or more email servers and each email server may be configured with one or more shared mailboxes. For instance, a shared mailbox may be a repository associated with an email server where emails addressed to a particular email address are received and stored. A shared mailbox may be accessible by several people (e.g., employees of an implementing organization) via a mail client. Accessibility by more than one person may be what denotes the mailbox as "shared" (as opposed to a private mailbox that is accessible to a single individual, only).

In accordance with aspects, a mail server that hosts a shared mailbox may be configured with an event listener (also referred to as an event handler). An event listener is a procedure or function in a computer program (e.g., built into the email server software) that actively waits for an event to occur. An event listener may be programmed to perform some action upon occurrence of the event that the listener is configured to listen for. A mail server may be configured to provide an event listener with respect to a shared mailbox, where the event listener is configured to provide a reception notification each time an email is received in a shared mailbox hosted by the mail server. A reception notification may be communicated to a capture module.

In accordance with aspects, a capture module may act as a gateway to an email processing platform. A capture module may receive reception notifications from an event listener of a mail server upon a new email being received at a shared mailbox. The reception notification may include a unique identifier that is assigned to an incoming email by the email server. The capture module may generate an event (e.g., a capture event) for an event streaming platform based on a reception notification.

An event streaming platform (e.g., Apache Kafka®) may be provided and configured for handling of associated events in the form of real time and near-real time streaming data to/from streaming data pipelines and/or streaming applications. Streaming data is data that is continuously generated by a data source (e.g., emails continually received at a shared mailbox of an email server). An event streaming platform can receive streaming data from multiple sources and process the data sequentially and incrementally. Event streaming platforms can be used in conjunction with real time and near-real time streaming data pipelines and streaming applications. For example, an event streaming platform can ingest and store streaming data from, e.g., a capture module and provide the data to an application that processes the streaming data. In exemplary aspects, mail events generated from a capture module may be considered streaming data.

An event streaming platform may include partitioned commit logs (each, an ordered sequence of records) to store corresponding streams of records. The logs are divided into partitions, and a subscriber can subscribe to a "topic" that is associated with a partition, and thereby receive all records stored at the partition (e.g., as passed to the subscriber in real time by the platform).

An event streaming platform may expose a producer API (Application Programming Interface) that publishes a stream of records from a streaming application or data pipeline to a topic, and a consumer API that a consumer application can use to subscribe to topics and thereby receive the record stream associated with that topic. An event streaming platform may also publish other APIs with necessary or desired functionality.

An event streaming platform may include a messaging queue. A messaging queue may be configured as a queue data structure and may facilitate communication between disparate systems or services. Services may place messages on the queue and may subscribe to and consume messages from the queue. A queue may be associated with a topic (i.e., subscription by a service to a topic may mean that the subscribing service receives all messages placed on the associated queue). A service or application that submits messages to a messaging queue is referred to as a producer, and a service or application that consumes messages from a messaging queue is referred to as a consumer.

The communication providing and consuming messages from a messaging queue may be asynchronous. That is, the messages may be placed on the queue by one service at one time and may be consumed from the queue by another service at another time, and a producer need not wait for a response from a consumer before continuing with other processing tasks (e.g., adding more messages to the queue). The messaging queue stores the message until the consumer consumes it. The messaging queue may include a message broker. A message broker may translate a message from a protocol or format that it is received in from the producer to a protocol or format that it is consumed in by the consumer.

A capture module may be configured as a streaming producer application and may generate capture events based on emails received in an email mailbox (e.g., a shared mailbox). A capture event may include data from a received email. For instance, a capture module may utilize a unique identifier received in a reception notification to query a mailbox for an email message that is associated with the unique identifier, retrieve the email associated with the unique identifier, and use data from the email message to generate a capture event.

A capture event may include email metadata as parameters of the capture event. Metadata may include values such as a value from the email "to" field (i.e., an address (email address) of the mailbox that the email was sent to), a value from the email "from" line (i.e., an address associated with the mailbox that sent the email), a date the email was received, the value from the subject field, and the content from the email body (e.g., extracted as a string value). A capture event may also include an attachment identifier if an email includes an attachment. An attachment identifier may be associated with an attachment of a received email. Email metadata may be included as parameters in a call to an application programming interface (API) method that is exposed by a producer API of an event streaming platform.

In accordance with aspects, a capture module may generate an attachment identifier for an attachment to a received email. A capture module may retrieve an email attachment from an email, generate a unique attachment identifier for the attachment, and store the attachment in a datastore that is accessible by a workflow platform with a relationship to the attachment identifier. The attachment identifier may be used as a lookup key by services of a workflow platform for retrieving the attachment from a datastore. A capture module may include an attachment identifier as part of an event payload of an event that is generated and sent to an event streaming platform.

A capture module may also generate and assign a correlation identifier to a received email. A correlation identifier may identify a group of related emails. For instance, all emails that are part of an email chain may be assigned a same correlation identifier. A capture module may include a correlation identifier as part of an event that is generated and sent to an event streaming platform. Aspects may generate a correlation identifier using a message identifier (ID) data object included in a header of a received email. When a received email is determined to be unrelated to any other previously received email, a capture module may provide the received email's message ID data object as input to a hashing function. Output from the hashing function (e.g., a fixed-length string) may then be used as a correlation identifier. All emails that are linked to the original email (e.g., an email in a thread where the thread starts with the original email) may be assigned the same correlation identifier.

In accordance with aspects, in identifying a group of related emails, a capture module may evaluate email data objects that link a received email to a prior-received email, such as an "in-reply-to" header, a "references" header, an email thread index, a conversation identifier (ID), etc. These various listed email linking data objects link a reply, a forward, or other email in an email chain to the message ID of an original email in that email chain. For instance, an in-reply-to header data object links a reply email to a message ID of an original email. A thread index object is an index number that indexes responses in an email thread. A "references" data object and conversation identifier data field are additional data objects that may be contained in an email header and that link an email that is part of a chain or thread of emails to an original, and unique Message ID. One or more of these fields may be evaluated by a capture module in order to assign a related correlation identifier to a received email.

In accordance with aspects, an event streaming platform may receive payload parameters from a capture module and may generate an event/message that is placed on a queue of the event streaming service. The event streaming platform may publish a topic associated with the queue, and consumer applications may subscribe to the topic and may consume the events placed as messages on the queue associated with the published topic.

In accordance with aspects, a workflow engine may subscribe to a topic published by an event streaming platform and may receive email metadata associated with the topic as a consumer of the topic. A workflow engine may receive the data as a response to an API method call specifying the topic as a parameter of the method call. A return response from the method call may include metadata associated with an email received in a shared mailbox and sent by a capture module to the responding event streaming platform. Upon receiving email metadata, a workflow engine may determine a workflow that an email associated with the received metadata will be assigned to.

In accordance with aspects, a workflow engine may analyze the email metadata and may determine a workflow that a corresponding email will be assigned to. A workflow engine may use rule-based processes and/or trained machine learning (ML) models in assigning an email to a workflow. Aspects may include processing email metadata with one or more ingestion rules to determine if the email is requesting a workflow for a new matter (i.e., a new case), or if the email is an update to, or otherwise related to, an existing case that is already assigned to a workflow. In scenarios where the received email metadata indicates that a corresponding email is related to an existing case (e.g., where a query of a correlation identifier results in a case that is already associated with the correlation identifier), a workflow engine may update the existing case with a pointer to the email and enrichment data based on the email. In scenarios where a correlation identifier is determined to be new, a workflow engine may create a new case, determine a workflow to assign the new case to, and may associate the new case with enrichment data based on the received email.

In accordance with aspects, a workflow engine may execute data enrichment procedures in order to extract data that is relevant to a case and a corresponding workflow. Aspects my execute a rules-based procedure that determines information about a request included in a received email. For instance, algorithmic rules in a rules-based data enrichment procedure may be based on associated email metadata and may include determining a shared mailbox that an email was received from (e.g., based on an email address in a "to" field), determining a request type, determining a request sub-type, determining a priority, etc. A line of business (LoB) and sub line of business of an implementing organization may also be determined based on a shared mailbox/email address passed as metadata to a workflow engine. A line of business and sub lines of business may be logical and hierarchical business units organized under an overarching parent organization.

Exemplary aspects may use rules-based procedures to retrieve data from other systems of an implementing organization's technology infrastructure. For instance, in a new case, client details may be extracted from a datastore using an email value from a "from" field or a received email as a lookup key for data related to the sending organization, such as the name of the sending organization, the name of a contact at the sending organization, a sending organization's physical address, etc.

In accordance with aspects, a workflow engine may also execute a data enrichment procedure using one or more trained machine learning models. For instance, a workflow engine may use email metadata as input to the machine learning model and may receive a classification and a priority as output from the ML model. A ML model may take as input, for instance, data extracted from the subject line of an email, data extracted from the body of the email, and data extracted from an attachment of the email. An email may be assigned classifications in categories that represent a type of request that an email is requesting (e.g., Maintenance, Payments, Agency Servicing, Advances, Funding Movement, Account Setup, Document Management, etc.) and further into a request sub type category, of which an implementing organization may define many.

In an exemplary embodiment, a workflow engine may receive an attachment identifier as metadata from an event streaming platform and may use the attachment identifier as a lookup key in a query of a data store where email attachments are stored. A query of the data store may return the email attachment that is associated with the attachment identifier. A workflow engine may then tokenize textual data included in, e.g., a retrieved attachment, an email body, a subject line, etc. A workflow engine may then embed vectors from the tokens created from the string/textual data and may pass the vectors as input to a ML model. The ML model may process the vectors and output a classification based on the provided vectors.

In accordance with aspects, a workflow engine may further include a string embedding engine for tokenization and vector embedding of textual data from an email attachment or from text/string parameters from a received email. A string embedding engine may include a document encoder. A document encoder may tokenize text included in input parameters, such as an email subject line, an email body, or an email attachment. A tokenization process may process received text into sub-portions of text. Each sub-portion may be a collection of one or more words, and may be referred to as a token, which may be used to analyze the text of a document. A tokenization process may split text on white space, may remove punctuation and stop words, and may retain, as tokens, terms that are useful in semantic ML evaluation of a documents contents. Token occurrences may be used as a vector that represents a document.

Aspects of a string embedding engine may include a token embedding module that embeds one or more tokens into a vector associated with the source of the embedded token(s).

A vector associated with a document may represent a semantic meaning of text included in a group of tokens generated from a tokenized parameter, and in turn, of the textual parameter, itself. Accordingly, a vector associated with a text parameter may be used, mathematically, to determine a relative similarity between a text parameter and text that the ML model was trained on. For instance, given several vectors associated with textual parameters (e.g., email and/or attachment parameters), vectors that are relatively more similar in terms of, e.g., cosign similarity may reflect a closer semantic similarity among one class of training data, and may therefore be classified by the ML model in the corresponding class of the similar training data.

In accordance with aspects, a workflow platform may include an optical character recognition (OCR) module that may execute in order to transform a picture of text into a string of text (i.e., a string data type), when necessary. For instance, an OCR module may take a picture-base file (e.g., a .pdf file or a .jpg file) that is an email attachment and may process the file to extract a string of text from text that is rendered in the image (but which does not include characters or string data).

In accordance with aspects, a workflow engine may use enriched data based on a received email to populate a database and, in turn, a user interface with relevant data about a received email. For instance, a user interface (such as a graphical user interface) may display a selected case to a user and may populate fields of the user interface with enriched data generated by the workflow engine. Data may further be used for reporting purposes, use to monitor service level agreements, etc., with respect to workflows requested by one or more emails associated with a workflow case.

In accordance with aspects, a workflow engine may persist email metadata and enriched data to a database and may store the data with a relationship to a lookup key, such as a correlation identifier. The lookup key may be used to retrieve metadata and enriched data related to a workflow case and to populate a user interface and/or a reporting engine.

FIG. 1 is a block diagram of a system for processing and classification of electronic mail, in accordance with aspects. System 100 includes workflow platform 110, shared mailbox 102 (which represents one of several shared mailboxes that may be associated with one or more email servers and serviced by workflow platform 110), and client device 130. Workflow platform 110 includes capture module 112, event streaming platform 114, workflow engine 116, OCR module 118, datastore 120, and reporting engine 122. Each of shared mailbox 102, workflow platform 110 and client device 130 may be included in a technology infrastructure of a providing organization.

In accordance with aspects, shared mailbox 102 may be provided by an email server (not shown). A providing email server may be configured with an event listener that generates a reception notification when an email is received at shared mailbox 102. Capture module 112 may be configured for operative communication with an email server hosting shared mailbox 102 and may be further configured to receive reception notifications generated when an email is received at shared mailbox 102.

In accordance with aspects, capture module 112 may be configured as a streaming producer application with respect to streaming platform 114. Capture module 112 may, for each reception notification received from shared mailbox 102, generate a capture event including email metadata based on the email that triggered the corresponding reception notification. Email metadata may include values such as a value from the email "to" field (i.e., an address (email address) of the mailbox that the email was sent to), a value from the email "from" line (i.e., an address associated with the mailbox that sent the email), a date the email was received, the value from the subject field, the content from the email body (e.g., extracted as a string value) and a correlation identifier. A capture event may also include an attachment identifier if the email included an attachment. Capture module 112 may send metadata parameters to streaming platform 114 via a published method of a producer API of streaming platform 114. Metadata may be sent as parameters or arguments of a published API method.

Capture module 112 may also execute a create query with respect to datastore 120, where the create query creates a record in datastore 120 that stores an email attachment with a relationship to an attachment identifier generated by capture module 112. Datastore 120 may be any suitable datastore, such as a relational database, a key-value pair datastore, a data lake, etc. While only datastore 120 is shown in FIG. 1, it is contemplated that any necessary or desirable number, type, and/or configuration of datastores may be included in workflow platform 110 in order to provide appropriate storage for the techniques described herein.

In accordance with aspects, streaming platform 114 may receive metadata parameters from capture module 112 and may place the metadata parameters in a queue that is associated with a topic (e.g., an "incoming mail" topic). The topic may be published so that consumers of the topic may retrieve the metadata from the queue associated with the topic and may further process the metadata, as described herein.

In accordance with aspects, workflow engine 116 may be configured as a consumer of a topic published by streaming platform 114. Workflow engine 116 may retrieve metadata associated with a received email from a queue of streaming platform 114. Based on the retrieved metadata, workflow engine 116 may determine a workflow case to assign an associated email message to and may perform data enrichment based on the retrieved metadata. Workflow engine 116 may be configured with algorithmic rules that are included in a rules-based data enrichment process that may be executed by workflow engine 116. Moreover, workflow engine 116 may be configured to execute a ML model that received metadata as input and outputs enriched data such as a classification of an email associated with input metadata and/or a priority of an email associated with input metadata.

In accordance with aspects, client device 130 may be configured with client software including a user interface that communicates with workflow engine 116 and/or reporting engine 122 for displaying and reporting on data including metadata and enriched data related to a workflow case and emails associated therewith. Client software may, using user input, format queries of datastore 120 and may pass the queries to workflow engine 116 and/or reporting engine 122, and may use query results to populate fields in a user interface.

FIG. 2 is a logical flow for processing and classification of electronic mail, in accordance with aspects.

Step 210 includes receiving, by a capture module, a reception notification from an email server, wherein the reception notification is triggered by an event handler of the email server and the event handler is configured to generate the reception notification upon receipt of an email in a mailbox of the email server.

Step 220 includes generating, by the capture module, a reception event including metadata related to the email that is received at the mailbox of an email server.

Step 230 includes sending, by the capture module, the reception event to an event streaming platform.

Step 240 includes retrieving, by a workflow engine, the email metadata from the event streaming platform.

Step 250 includes providing, by the workflow engine and as input to a rules-based procedure, the email metadata.

Step 260 includes receiving, by the workflow engine and as output from the rules-based procedure, data related to a sender of the email.

Step 270 includes providing, by the workflow engine and as input to a machine learning model, the email metadata.

Step 280 includes receiving, by the workflow engine and as output from the machine learning model, a classification of the email.

Step 290 includes storing, by the workflow engine, the data related to the sender of the email and the classification of the email in a datastore, wherein the datastore is accessible to a client application for retrieval of the data related to the sender of the email and the classification of the email.

Figure 3:
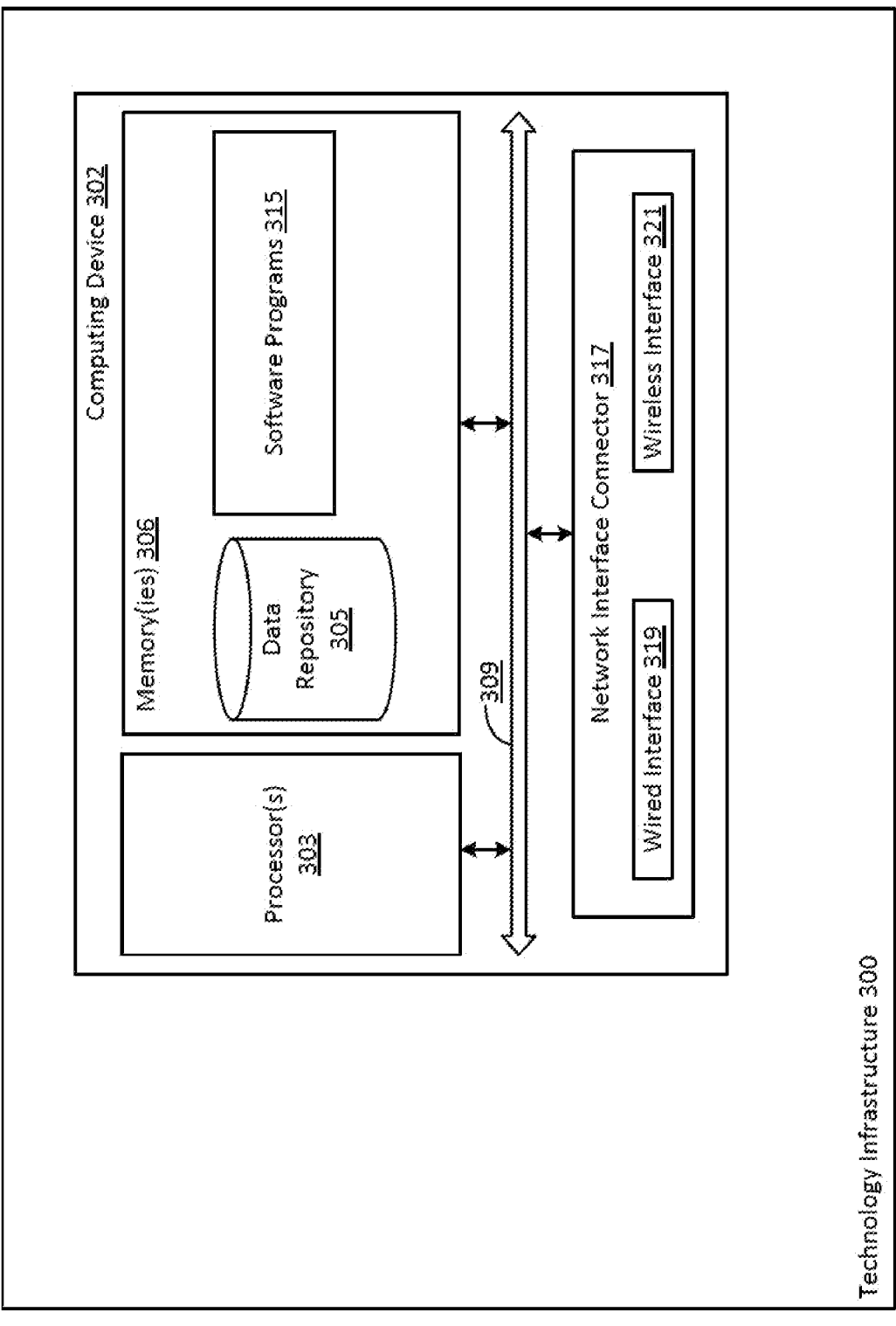
FIG. 3 is a block diagram of a technology infrastructure and computing device for implementing certain aspects of the present disclosure, in accordance with aspects.

FIG. 3 is a block diagram of a technology infrastructure and computing device for implementing certain aspects of the present disclosure, in accordance with aspects. FIG. 3 includes technology infrastructure 300. Technology infrastructure 300 represents the technology infrastructure of an implementing organization. Technology infrastructure 300 may include hardware such as servers, client devices, and other computers or processing devices. Technology infrastructure 300 may include software (e.g., computer) applications that execute on computers and other processing devices. Technology infrastructure 300 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 300 may include webservers, application servers, database servers and database engines, communication servers such as email servers and SMS (Short Message Service) servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 300 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 300 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper or fiber optic wire/cable) that forms a physical computer network. Routers, switches, and firewalls may also have "wireless" interfaces that facilitate data transmissions via radio waves. A computer network included in technology infrastructure 300 may include both wired and wireless components and interfaces and may interface with servers and other hardware via either wired or wireless communications. A computer network of technology infrastructure 300 may be a private network but may interface with a public network (such as the internet) to facilitate operative communication between computers executing on technology infrastructure 300 and computers executing outside of technology infrastructure 300.

FIG. 3 further depicts exemplary computing device 302. Computing device 302 depicts exemplary hardware that executes the logic that drives the various system components described herein. Servers and client devices may take the form of computing device 302. While shown as internal to technology infrastructure 300, computing device 302 may be external to technology infrastructure 300 and may be in operative communication with a computing device internal to technology infrastructure 300.

In accordance with aspects, system components such as a capture module, an event streaming platform, a workflow engine, an OCR module, a reporting engine, client devices, servers, various database engines and database services, and other computer applications and logic may include, and/or execute on, components and configurations the same, or similar to, computing device 302.

Computing device 302 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 302 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/ modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Extensible Markup Language Remote Procedure Call, Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array) or PAL (Programmable Array Logic), or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN (Local Area Network), an Ethernet, wireless communication via cell tower or satellite, or any client server system that provides communication, for example. Such communications technologies may use any suitable protocol such as TCP/IP (Transmission Control Protocol/Internet Protocol), UDP (User Datagram Protocol), or OSI (Open Systems Interconnection), for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD (Digital Versatile Disc), an integrated circuit, a hard disk, a floppy disk, an optical disk, a magnetic tape, a RAM (Random-Access Memory), a ROM (Read-Only Memory), a PROM (Programmable Read-Only Memory), an EPROM (Erasable Programmable Read-Only Memory), a wire, a cable, a fiber, a communications channel, a satellite transmission, a memory card, a SIM (Subscriber Identity Module) card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
continuously receiving, by a capture module, a reception notification from an email server, wherein the reception notification is triggered by an event handler of the email server and the event handler is configured to generate the reception notification upon receipt of an email at a mailbox of the email server;
continuously receiving, by a workflow engine and as output from a rules-based procedure, data related to a sender of the email;
continuously generating, by the capture module, a reception event including metadata related to the email that is received at the mailbox of the email server;
continuously sending, by the capture module, the reception event to an event streaming platform;
continuously retrieving, by the workflow engine, email metadata, wherein the email metadata is related to the email that is received at the mailbox of the email server; and
continuously providing, by the workflow engine and the event streaming platform, and as input to the rules-based procedure, the email metadata.

2. The method of claim 1, comprising:
providing, by the workflow engine and as input to a machine learning model, the email metadata.

3. The method of claim 2, comprising:
receiving, by the workflow engine and as output from the machine learning model, a classification of the email.

4. The method of claim 3, comprising:
storing, by the workflow engine, the data related to the sender of the email and the classification of the email in a datastore, wherein the datastore is accessible to a client application for retrieval of the data related to the sender of the email and the classification of the email.

5. The method of claim 1, wherein the email metadata includes an attachment identifier, and the attachment identifier is related to an attachment that is attached to the email.

6. The method of claim 1, wherein the email metadata is retrieved from the event streaming platform.

7. A system comprising at least one computer including a processor and a memory, wherein the at least one computer is configured to:
continuously receive, by a capture module, a reception notification from an email server, wherein the reception notification is triggered by an event handler of the email server and the event handler is configured to generate the reception notification upon receipt of an email in a mailbox of the email server;
continuously receive, by a workflow engine and as output from a rules-based procedure, data related to a sender of the email;
continuously generate, by the capture module, a reception event including metadata related to the email that is received at the mailbox of the email server;
continuously send, by the capture module, the reception event to an event streaming platform;
continuously retrieve, by the workflow engine, email metadata, wherein the email metadata is related to the email that is received at the mailbox of the email server; and
continuously provide, by the workflow engine and the event streaming platform, and as input to the rules-based procedure, the email metadata.

8. The system of claim 7, wherein the at least one computer is configured to:
provide, by the workflow engine and as input to a machine learning model, the email metadata.

9. The system of claim 8, wherein the at least one computer is configured to:
receive, by the workflow engine and as output from the machine learning model, a classification of the email.

10. The system of claim 9, wherein the at least one computer is configured to:
store, by the workflow engine, the data related to the sender of the email and the classification of the email in a datastore, wherein the datastore is accessible to a client application for retrieval of the data related to the sender of the email and the classification of the email.

11. The system of claim 7, wherein the email metadata includes an attachment identifier, and the attachment identifier is related to an attachment that is attached to the email.

12. The system of claim 7, wherein the email metadata is retrieved from the event streaming platform.

13. A non-transitory computer readable storage medium, including instructions stored thereon, which instructions, when read and executed by one or more computer processors, cause the one or more computer processors to perform steps comprising:
continuously receiving, by a capture module, a reception notification from an email server, wherein the reception notification is triggered by an event handler of the email server and the event handler is configured to generate the reception notification upon receipt of an email in a mailbox of the email server;
continuously receiving, by a workflow engine and as output from a rules-based procedure, data related to a sender of the email;
continuously generating, by the capture module, a reception event including metadata related to the email that is received at the mailbox of the email server;

continuously sending, by the capture module, the reception event to an event streaming platform;

continuously retrieving, by the workflow engine, email metadata, wherein the email metadata is related to the email that is received at the mailbox of the email server; and continuously providing, by the workflow engine and the event streaming platform, and as input to the rules-based procedure, the email metadata.

14. The non-transitory computer readable storage medium of claim 13, comprising:

providing, by the workflow engine and as input to a machine learning model, the email metadata.

15. The non-transitory computer readable storage medium of claim 14, comprising:

receiving, by the workflow engine and as output from the machine learning model, a classification of the email.

16. The non-transitory computer readable storage medium of claim 15, comprising:

storing, by the workflow engine, the data related to the sender of the email and the classification of the email in a datastore, wherein the datastore is accessible to a client application for retrieval of the data related to the sender of the email and the classification of the email.

17. The non-transitory computer readable storage medium of claim 13, wherein the email metadata includes an attachment identifier, and the attachment identifier is related to an attachment that is attached to the email, and wherein the email metadata is retrieved from the event streaming platform.

\* \* \* \* \*